(12) United States Patent
Hattori et al.

(10) Patent No.: US 7,188,586 B2
(45) Date of Patent: Mar. 13, 2007

(54) FUEL INJECTION SYSTEM FOR DIESEL ENGINES

(75) Inventors: Kazutaka Hattori, Yokohama (JP); Taisuke Murotani, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 51 days.

(21) Appl. No.: 10/625,725

(22) Filed: Jul. 24, 2003

(65) Prior Publication Data

US 2004/0144339 A1  Jul. 29, 2004

(30) Foreign Application Priority Data

Jul. 25, 2002 (JP) .................................... 2002-216824

(51) Int. Cl.
*F02M 25/03* (2006.01)

(52) U.S. Cl. .................... 123/25 C; 123/305
(58) Field of Classification Search ............... 123/25 C, 123/25 R, 25 D, 305
See application file for complete search history.

(56) References Cited

U.S. PATENT DOCUMENTS

| | | | | |
|---|---|---|---|---|
| 5,522,349 | A | * | 6/1996 | Yoshihara et al. ......... 123/25 C |
| 6,273,032 | B1 | * | 8/2001 | Ruoff et al. ............... 123/25 R |
| 6,637,381 | B2 | * | 10/2003 | Stanglmaier et al. ..... 123/25 F |

FOREIGN PATENT DOCUMENTS

| | | | |
|---|---|---|---|
| JP | 6-25542 | | 4/1994 |
| JP | 6-147019 | | 5/1994 |
| JP | 09126084 A | * | 5/1997 |
| JP | 2668026 | | 7/1997 |
| JP | 2812655 | | 8/1998 |
| JP | 11-30164 | | 2/1999 |
| JP | 3191581 | | 5/2001 |

* cited by examiner

*Primary Examiner*—Stephen K. Cronin
*Assistant Examiner*—Hyder Ali
(74) *Attorney, Agent, or Firm*—Posz Law Group, PLC; R. Eugene Varndell, Jr.

(57) ABSTRACT

A fuel injection system for diesel engines, capable of carrying out a control operation for varying a mixing ratio of a fuel to water (inert material) arbitrarily in accordance with the magnitude of an engine load in a short period of time, and holding down the formation of nitrogen oxides to a level equal to that in a related art fuel injection system using an aqueous emulsion fuel, by uniformly mixing the fuel in the same manner as an aqueous emulsion fuel used in a related art fuel injection system, with water (inert material) in the combustion chamber. A fuel is injected from a fuel injection nozzle toward the water (inert material) held in water holding portions, or a fuel is injected from a fuel injection nozzle into the water (inert material) supplied from water supply passages.

10 Claims, 9 Drawing Sheets

VIEWED IN DIRECTION OF ARROW A

VIEWED IN DIRECTION OF ARROW B

FIG. 4C

VIEWED IN DIRECTION OF ARROW C

FUEL INJECTION SYSTEM FOR DIESEL ENGINES

BACKGROUND OF THE INVENTION

1. Field of the Invention

This invention relates to a diesel engine.

2. Description of the Related Art

As compared with a gasoline engine, a diesel engine is superior in a thermal efficiency, and has the advantage of withstanding severe conditions (continuous high-load operation). On the other hand, however, a diesel engine discharges nitrogen oxides $NO_x$ and soot (particulate discharged substances). Therefore, an exhaust gas of a diesel engine is not clean, so that a diesel engine is environmentally undesirable. Under the circumstances, the reduction of $NO_x$ and the reduction of a discharge rate of soot are being required of a diesel engine.

In a diesel engine, a fuel is injected from an injection port of a fuel injection nozzle into a combustion chamber (compression chamber) compressed by a piston, and fuel spray is thereby formed, the fuel being thereby burnt.

In a regular diesel engine, a fuel is injected from an injection port of a fuel injection nozzle into a combustion chamber (cylinder) during a predetermined injection period in which a piston is in a position in the vicinity of a top dead center (T.D.C.), and combustion energy is thereby generated.

However, since the temperature in the combustion chamber becomes high, nitrogen oxides ($NO_x$) occur in large quantities. Moreover, a portion of an excessively rich gaseous mixture locally occurs in the combustion chamber to cause soot to be formed.

Under the circumstances, attempts to hold down the occurrence of nitrogen oxides have heretofore been made by injecting an aqueous emulsion fuel, which is obtained by mixing a fuel and water with each other in advance, from a fuel injection nozzle into a fuel combustion chamber.

When the aqueous emulsion fuel is injected from the fuel injection nozzle into a combustion chamber, the thermal capacity of the interior of the combustion chamber increases due to the influence of the latent heat of evaporation of the water and a high specific heat thereof. This causes a combustion temperature in the combustion chamber to decrease.

When an aqueous emulsion fuel is injected into a combustion chamber, the fuel and water are dispersed uniformly in the combustion chamber, and the particles of the fuel are microscopically put in the condition in which the particles of the fuel a recovered with inert vapor. As a result, an ignition delay occurs, and the combustion of the fuel starts with the mixing of the fuel and suction air with each other promoted. This enables an increase in the temperature to a high level in a local combustion field to be avoided.

Thus, the combustion temperature in the combustion chamber decreases, and an increase in the temperature to a high level in a local combustion field can be avoided, so that the formation of nitrogen oxides can be held down. Since the occurrence of a portion of an excessively rich gaseous mixture in the combustion chamber can be avoided, the formation of soot can be held down.

It is said that, when an aqueous emulsion fuel is used, the occurrence of nitrogen oxides decreases to ⅕.

However, since the aqueous emulsion fuel has to be injected into a combustion chamber after the fuel is mixed with water in advance, it is difficult to carry out an operation for varying a fuel-water mixing ratio arbitrarily in accordance with the magnitude of a load applied on a diesel engine and temperature conditions in a short period of time. Therefore, the aqueous emulsion fuel is necessarily used at a predetermined mixing ratio of the fuel and water.

When a diesel engine is used as a generator operated with a predetermined load by using an aqueous emulsion fuel having a fuel-water mixing ratio of even a predetermined level, a problem does not arise. When a diesel engine is used for a construction machine in which a load and temperature conditions vary incessantly, the combustion condition is deteriorated when a load is at a certain level in certain temperature conditions.

When a larger quantity of water is mixed with the fuel in accordance with a high engine load with the engine operated at, for example, a rated point, a combustion temperature does not attain a suitable level at a low-load operation of the engine, for example, during a low idling time, and unburnt fuel is discharged in large quantities. Conversely, when a smaller quantity of water is mixed with the fuel in accordance with a low engine load, the combustion temperature becomes high at a high-load operation of the engine, and nitrogen oxides are discharged in large quantities.

In view of this, a method of varying a mixing ratio of a fuel to water arbitrarily in accordance with the magnitude of a load and temperature conditions in a short period of time is being tried as follows.

1) The injection nozzles for a fuel and water are provided separately, and the water and fuel injected from the two injection nozzles are mixed with each other in a combustion chamber.

2) Predetermined quantities of water and fuel are supplied alternately to the injection nozzle, and the water and fuel are injected from the same nozzles alternately into the combustion chamber so as to mix them with each other therein.

In all of these methods 1), 2), the fuel is injected into the portion of the interior of the combustion chamber into which the water was just injected, and, therefore, the fuel and water are rarely dispersed uniformly in the combustion chamber. This causes a local combustion field in which the particles of the fuel are not microscopically covered with inert vapor to be formed, and an increase in the temperature to a high level in this local combustion field cannot be avoided. As a result, the formation of the nitrogen oxides cannot be sufficiently held down.

SUMMARY OF THE INVENTION

The present invention has been made in view of such actual circumstances, and provides a fuel injection system for diesel engines, capable of carrying out a control operation for varying a mixing ratio of a fuel to water (inert material) arbitrarily in accordance with the magnitude of a load in a short period of time, and having a problem to be solved of holding down the formation of nitrogen oxides to a level equal to that in a related art fuel injection system using an aqueous emulsion fuel by uniformly dispersing a fuel and water (inert material) in the combustion chamber.

The present invention further provides a fuel injection system for diesel engines, including:

a fuel injection nozzle 8 adapted to inject a fuel toward the interior of a fuel chamber 2 of a diesel engine 1, and an inert material supply passage 15 adapted to supply a material inert with respect to the fuel, the fuel being supplied from the fuel injection nozzle 8 toward the inert material supplied from the inert material supply passage 15.

Figure 4A:
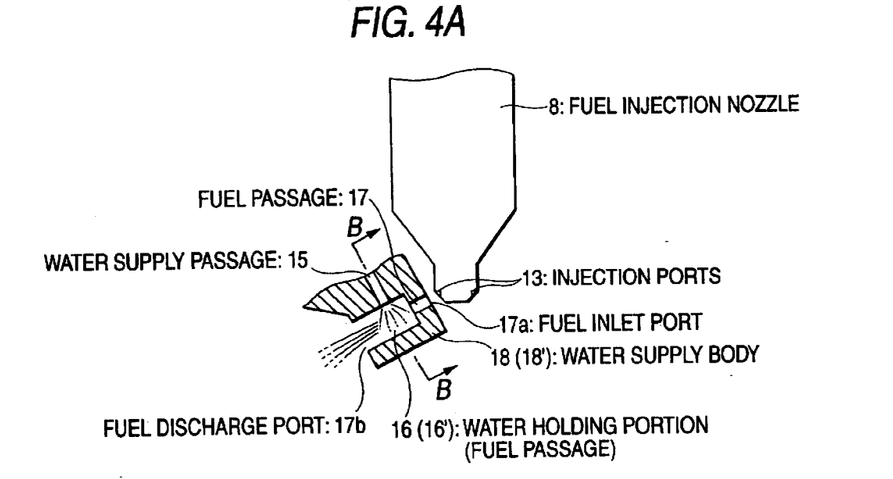
FIGS. 4A, 4B and 4C are drawings showing the detailed construction of the water supply body of FIG. 3.

According to a third invention, a fuel from a fuel injection nozzle 8 is injected toward water supplied from the water supply passage 15 (a material inert with respect to the fuel, i.e. a material as long as it has a low ignitability serves the purpose. Besides the water, alcohol and an aqueous emulsion fuel will do as well.) as shown in FIG. 4A.

Since the fuel is injected toward the water supplied from the water supply passage 15, the fuel and water are uniformly dispersed into the combustion chamber 2, and the particles of the fuel are microscopically covered with inert vapor. Therefore, an ignition delay of the fuel occurs, and the combustion of the fuel starts with the mixing of the fuel and suction air promoted. This enables an increase in the temperature to a high level in a local combustion field to be avoided. As a result, the formation of nitrogen oxides can be held down to a level equal to that in a case where a related art aqueous emulsion fuel is used.

When a supply rate of the water from the water supply passage 15 is regulated, a control operation for varying a mixing ratio of the fuel to water can be carried out arbitrarily in accordance with the magnitude of a load and temperature conditions in a short period of time.

The water supplied from the water supply passage 15 may be held in a water holding portion 16. In this case, the fuel is injected toward the water thus held in the water holding portion 16.

A second invention is identical with the first invention except that the second invention is provided with a control unit 5 for controlling the quantity of an inert material supplied from an inert material supply passage 15.

Figure 1:
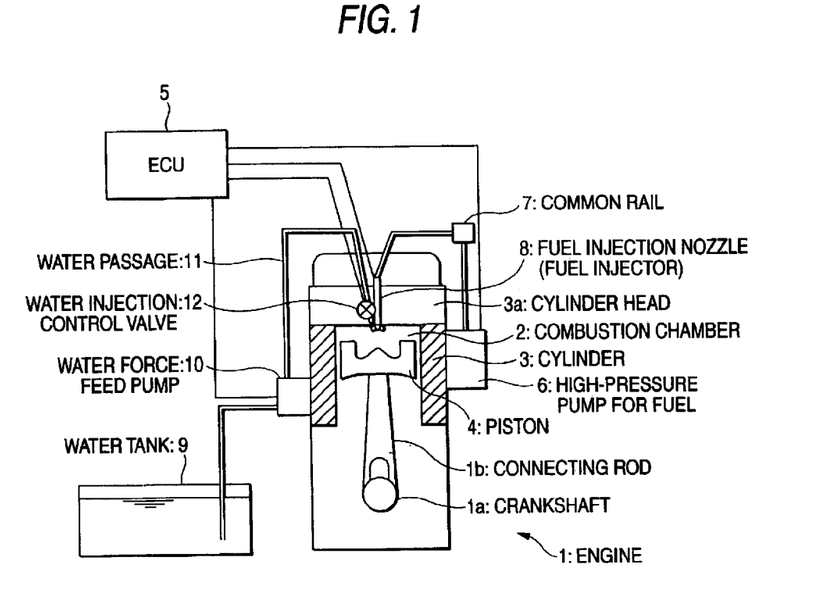
FIG. 1 is a drawing showing the construction of a first mode of embodiment.

According to the second invention, the quantity of the water supplied from the water supply passage 15 can be varied by such an ECU (control unit) 5 as shown in FIG. 1. This enables a mixing ratio of the fuel to water to be varied arbitrarily in accordance with the magnitude of a load and temperature conditions in a short period of time.

The third invention provides a fuel injection system for diesel engines, identical with the first invention except that the third invention is provided with fuel passages 16, 17 communicating with an inert material supply passage 15 and adapted to pass a fuel, which is injected from a fuel injection nozzle 8, therethrough, the inert material supply passage 15 communicating with the fuel passages 16, 17 in a position offset from a center of cross sections of the same fuel passages 16, 17.

According to the third invention, the fuel is injected toward the water supplied from the water supplying passage 15, so that the same effect as in the first invention can be obtained.

Figure 4B:
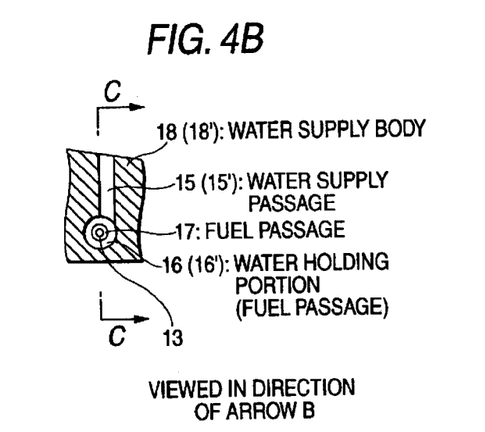

According to the third invention, the water supply passage 15 communicates with a water holding portion (which serves also as a fuel passage) 16 as shown in FIG. 4B at the section thereof which is offset from the center of cross sections of the fuel passages 16, 17. Therefore, when the water is supplied from the water supply passage 15 to the water holding portion 16 as shown in FIG. 4D, the water is held mainly on an inner circumferential surface of the water holding portion 16 due to a centrifugal force. This water is mixed with the fuel, which passes through the inner side of the water, so as to wrap the fuel therein, and injected in a mixed fuel state containing a larger quantity of water in an outer circumferential portion thereof from a fuel discharge port 17b into the interior of the combustion chamber 2. As a result, the fuel spray is put in a condition in which the fuel is covered with inert vapor. Therefore, an ignition delay of the fuel is further promoted, and the combustion of the fuel starts with the mixing of the fuel and suction air further promoted. This enables an increase in temperature to a high level in a local combustion field to be further held down, and the formation of nitrogen oxides to be further reduced.

BRIEF DESCRIPTION OF THE DRAWINGS

Preferred embodiments of the present invention will now be described with reference to the accompanying drawings, wherein:

FIGS. 5A to 5H are timing charts showing the ignition time, fuel injection time and water injection time correspondingly to crank angles;

FIGS. 9A to 9H are timing charts showing the ignition time, fuel injection time and water injection time correspondingly to crank angles;

DESCRIPTION OF THE PREFERRED EMBODIMENTS

Each mode of embodiment of the present invention will now be described with reference to the drawings.
First Mode of Embodiment:

FIG. 1 shows a general construction of the first mode of embodiment of the fuel injection system for diesel engines.

The diesel engine 1 generally includes a cylinder 3, a piston 4 provided slidably in the cylinder 3 and adapted to be moved up and down reciprocatingly in the cylinder 3, and a crankshaft 1a joined to the piston 4 via a connecting rod 1b and rotated in accordance with reciprocating movements of the piston 4.

An upper portion in the drawing of the piston 4 and a cylinder chamber constitute a combustion chamber (compression chamber) 2. The combustion chamber 2 serves also as a compression chamber in which a gaseous mixture is compressed by the piston 4, and also as a combustion chamber in which a fuel in the gaseous mixture is burnt. A cavity formed in the piston 4 occupies a main part of the volume of the combustion chamber 2.

An exhaust gas formed by the combustion in the combustion chamber 2 is discharged to the outside air through an exhaust valve (not shown) and an exhaust pipe (not shown)

The engine 1 is provided with a suction pipe (not shown) and a suction valve (not shown) for supplying the air thereto. The air is supplied to the interior of the combustion chamber 2 via the suction pipe and suction valve.

An upper portion in the drawing of the combustion chamber 2 which corresponds to a head portion of the cylinder 3, i.e., a cylinder head 3a is provided with a fuel injector, i.e. a fuel injection nozzle 8.

In this mode of embodiment, the provision of a common rail type system is assumed.

The fuel in a fuel tank is sucked by a high-pressure pump 6 for the fuel, and sent under pressure to the fuel injection nozzle 8 via a common rail 7. The fuel sending high-pressure pump 6 is operated in accordance with a rotation of the engine 1, and adapted to discharge a fuel of a predetermined volume per rotation of the engine 1. A unit injector system and a jerk type row pump may also be used.

Figure 2A:
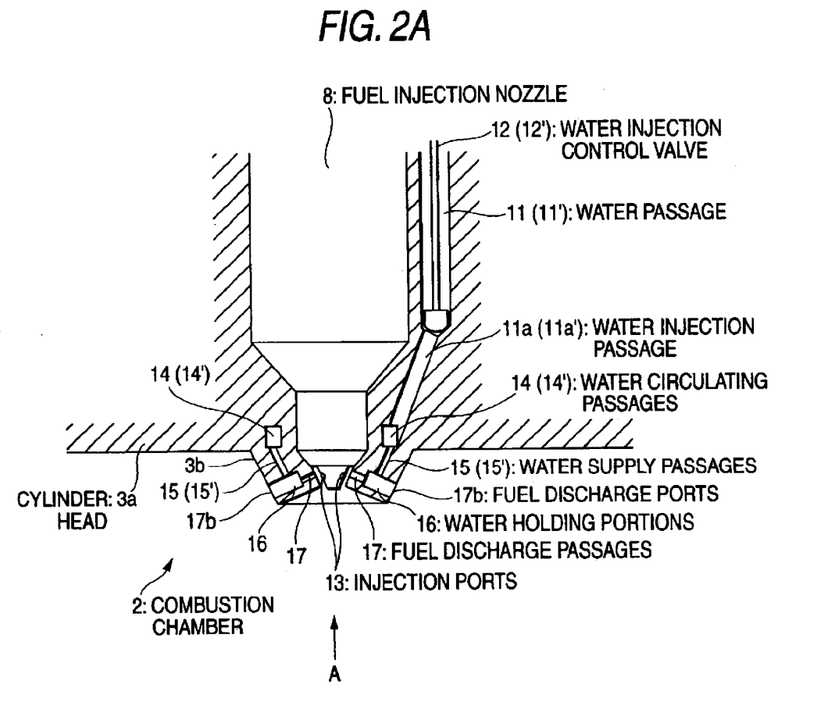
FIGS. 2A and 2B are drawings showing the construction of a fuel injection nozzle and its surrounding parts shown in FIG. 1.

The fuel injection nozzle 8 is provided at a free end thereof with, for example, six injection ports 13 (refer to FIG. 2A). The fuel is injected into the interior of the cylinder 3, i.e. that of the combustion chamber 2 via the injection ports 13.

When the fuel is injected from the fuel injection nozzle 8, the fuel is atomized, and fuel spray is formed in the combustion chamber 2. This fuel spray is mixed with the air supplied through the suction pipe to be turned into a gaseous mixture. When the combustion chamber 2 is then compressed with the temperature attaining an ignition temperature, the gaseous mixture is burnt.

In this mode of embodiment, the water inert with respect to the fuel, i.e., having a low ignitability is supplied to a position in the vicinity of the injection ports 13 of the fuel injection nozzle 8 as will be described later. Thus, the fuel and water are injected into the combustion chamber 2 at a predetermined mixing ratio thereof.

The water in a water tank 9 is sucked by a water pressure sending pump 10, and supplied to a position in the vicinity of outlets of the injection ports 13 of the fuel injection nozzle 8 through a water passage 11. The water passage 11 is provided with a water injection control valve 12. The water the quantity of which is proportional to the time during which the water injection control valve 12 is opened is supplied to a position in the vicinity of the outlets of the injection ports 13 of the fuel injection nozzle 8.

A fuel the quantity of which is proportional to the time (during which a needle valve is lifted) during which the injection ports 13 are opened by the needle valve in the fuel injection nozzle 8 is necessarily injected into the combustion chamber 2.

A mixing ratio of the fuel to water in the combustion chamber 2 is determined by a ratio of a quantity (which will hereinafter be referred to as a fuel injection rate) of the fuel injected from the injection ports 13 of the fuel injection nozzle 8 per rotation of a crankshaft 1a of the engine 1 to a quantity (which will hereinafter be referred to as a water injection rate) of the water supplied to a position in the vicinity of outlets of the injection ports 13 through the water passage 11 per rotation of the crankshaft 1a. Therefore, the mixing ratio of the fuel to the water in the combustion chamber 2 is determined by a ratio of the time during which the injection ports 13 are opened per rotation of the crankshaft 1a to the time during which the water injection control valve 12 is opened per rotation of the crankshaft 1a.

The ECU (Electrical Control Unit) 5 is a control unit for controlling the opening time of the injection ports 13 and that of the water injection control valve 12. In the mode of embodiment, a rotational frequency of the engine 1, an angle (which will hereinafter be referred to as a crank angle) of rotation of the crankshaft 1a, a load on the engine 1, and an oil temperature, a water temperature, a suction air temperature, an exhaust gas temperature of the engine 1 are taken in as output signals of various kinds of sensors, and the fuel injection rate and water injection rate are controlled so that a mixing ratio of the fuel to the water in the combustion chamber 2 attains an optimum level. Namely, the ECU 5 is adapted to output an injection port opening instruction to the fuel injection nozzle 8, and a water passage opening instruction to the water injection control valve 12, thereby control a fuel injection rate and a water injection rate, and set a mixing ratio of the fuel to water in the combustion chamber 2 to an optimum level.

The ECU 5 is also adapted to control the high-pressure pump 6 for the fuel and the water pressure sending pump 10.

The fuel injection nozzle 8, a water supply mechanism provided on the outer side of this fuel injection nozzle 8 and the fuel passage will be described with reference to FIG. 2.

FIG. 2A is a longitudinal sectional view of the fuel injection nozzle 8. The cylinder head 3a is provided with a projection 3b so that the projection 3b extends toward the combustion chamber 2 (downward in the drawing). The fuel injection nozzle 8 is provided in the cylinder head 3a so that the injection ports 13 are positioned near the projection 3b.

The cylinder head 3a is provided with the water passage 11, water injection passage 11a and a water circulating passage 14, while the projection 3b of the cylinder head is provided with the water supply passages 15, water holding portions 16 and fuel passages 17.

The water passage 11 communicates with the water injection passage 11a, which communicates with the circulating passage 14. The circulating passage 14 communicates with the water supply passage 15, which communicates with the water holding portion 16. The injection ports 13 communicate with the fuel passage 17 via a very narrow gap, and this fuel passage 17 communicates with the water holding portion 16. The fuel discharge port 17b, which constitutes an outlet of the water holding portion 16, is opened toward the combustion chamber 2.

Between the water passage 11 and water injection passage 11a, a water injection control valve 12 is interposed.

Figure 2B:
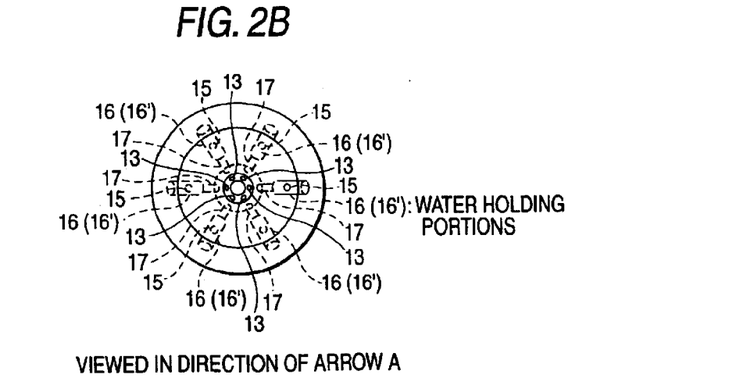

FIG. 2B is a drawing taken in the direction of an arrow A in FIG. 2A, and showing the construction of an outer circumferential part of a free end portion of the fuel injection nozzle 8. The water circulating passage 14 is formed annularly so as to surround the outer circumference of the free end portion of the fuel injection nozzle 8. Six water supply passages 15 and six water holding portions 16 are formed so as to extend along an outer circumference of the free end portion of the fuel injection nozzle 8, and in positions opposed to the six injection ports 13 as shown in FIG. 2B. Six fuel passages 17 are formed in the same manner so as to extend along the outer circumference of the free end portion of the fuel injection nozzle 8, and in positions opposed to the six injection ports 13.

Owing to this arrangement, the water flows from the water passage 11 in accordance with the opening of the water injection control valve 12 into the water injection passage 11a, the water being then supplied to the water holding portion 16 via the water injection passages 11a, water circulating passages 14 and water supply passages 15 and held therein. In accordance with the opening time of the water injection control valve 12, a supply rate of the water sent to the water supply passages 15 and a quantity of the water held in the water holding portion 16 are determined.

When the injection ports 13 are opened, the fuel passes through the fuel passage 17 and water holding portion 16. Thus, the water holding portion 16 is a portion to which the water is supplied, in which the water is held, and through which the fuel passes. Since the fuel is injected into the water held in the water holding portion 16, a mixed fuel in which the fuel and water are mixed with each other is injected from the fuel discharge port 17b into the combustion chamber 2.

Figure 3:
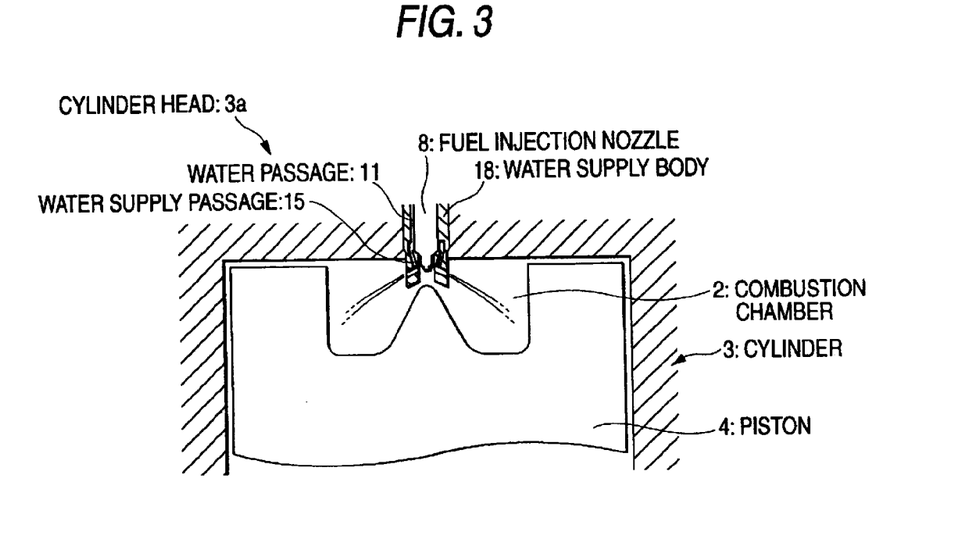
FIG. 3 is a drawing showing a construction example provided with a water supply body around a fuel injection nozzle.

Referring to FIG. 2, a water supply mechanism (water passage 11, water injection passage 11a, water circulating passages 14, water supply passages 15 and water holding portions 16) and fuel passages 17 on the outer side of the fuel injection nozzle 8 are formed in the cylinder head 3a. As shown in FIG. 3, a water supply body 18 may be provided on the outer side of the fuel injection nozzle 8, and the water supply body 18 may be provided therein with the same water supply mechanism (water passage 11, water injection passage 11a, water circulating passages 14, water supply passages 15 and water holding portions 16) and fuel passages 17 as shown in FIG. 2.

Figure 4C:
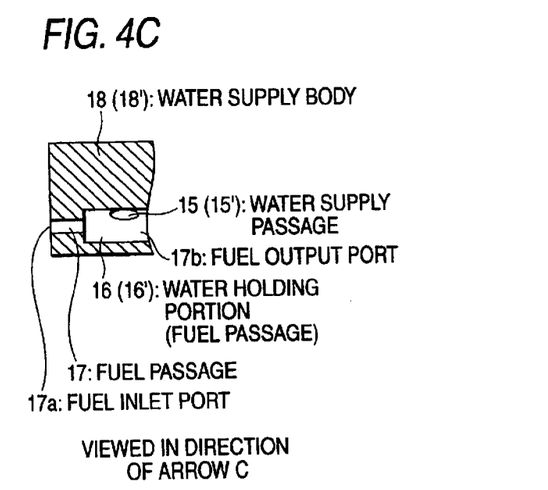
Figure 4D:
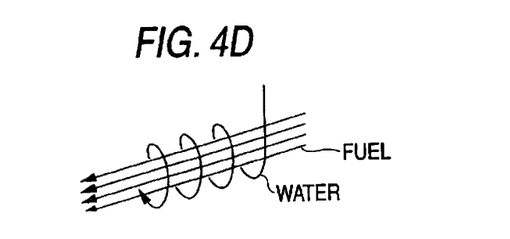
FIG. 4D is a drawing ideologically showing the condition of a fuel injected with the water from a water supply body.

FIGS. 4A, 4B and 4C are partially cutaway views in section of the part of the same water supply body 18 as is shown in FIG. 3 which constitutes a structure in the vicinity of the outlets of the injection ports 13.

FIG. 4A is a longitudinal sectional view of the fuel injection nozzle 8, FIG. 4B a drawing taken in the direction of arrows B in FIG. 4A, i.e. a front view of an injection port 13, and FIG. 4C a drawing taken in the direction of arrows C in FIG. 4B.

As shown in FIG. 4A, the fuel passage 17 and water holding portion 16 are formed in the water supply body 18 so that the axes of these passages are aligned with the direction in which the fuel from the injection port 13 is injected. A fuel inlet 17a constituting an inlet of the fuel passage 17 is opened toward the injection port 13. The fuel passage 17 and water holding portion 16 are formed so that the cross sections of the passages are formed to a circular or substantially circular shape, and the centers (centers of the circles) of the cross sections are aligned with each other. The fuel passage 17 and water holding portion 16 have cross sections of different diameters, the diameter of the cross section of the latter being larger.

As shown in FIG. 4B, the water supply passage 15 communicates with the water holding portion 16 at the part thereof which is offset from the centers of the cross sections of the fuel passage 17 and water holding portion 16.

The operation of the first mode of embodiment will now be described. The following description is given on the assumption that the engine 1 of the mode of embodiment is mounted on a machine in which a load varies greatly during an operation thereof, such as a construction machine.

Figure 5A:
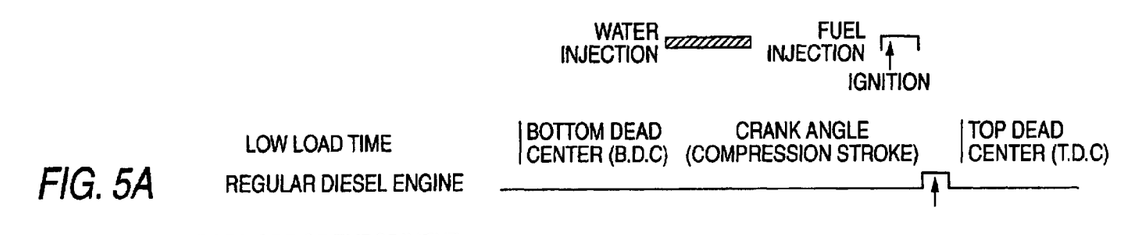
FIGS. 5A and 5E are timing chart of a regular diesel engine.
Figure 5B:
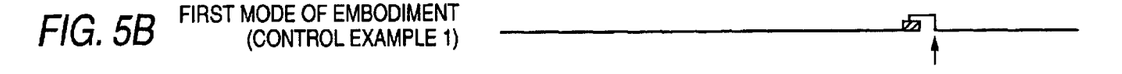
FIGS. 5B, 5C, 5D, 5F, 5G and 5H are timing charts of a diesel engine in the first mode of embodiment.
Figure 5C:
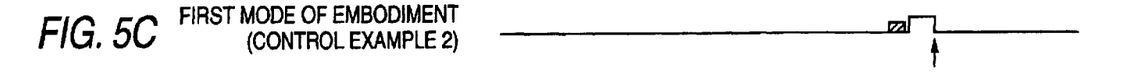
Figure 5D:
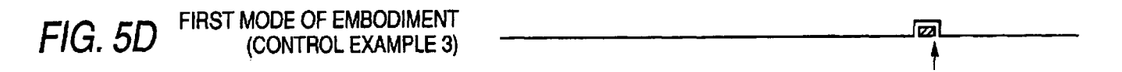
Figure 5E:
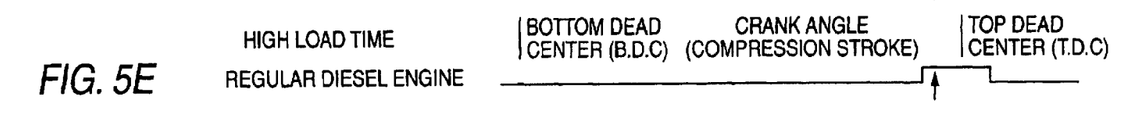
Figure 5F:
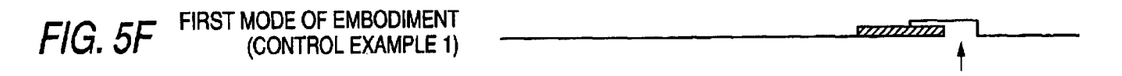
Figure 5G:
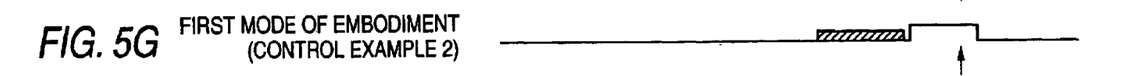
Figure 5H:
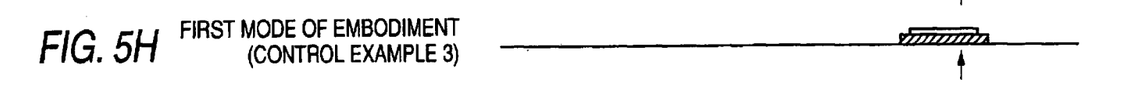

The timing charts of the first mode of embodiment are shown in FIGS. 5B, 5C, 5D, 5F, 5G and 5H. FIGS. 5B, 5C and 5D show a control example 1, a control example 2 and a control example 3 respectively in which a load is low, i.e. in the cases where the engine 1 is operated at a low idling point (with a low idling rotational frequency and no load). FIGS. 5F, 5G and 5H show a control example 1, a control example 2 and a control example 3 respectively in which a load is high, i.e. in the cases where the engine 1 is operated at a rated point (at a rated rotational frequency and a maximum output).

In FIG. 5, a crank angle of the crankshaft 1a rotated in accordance with the reciprocating movements of the piston 4 is taken along the lateral axis, and the timing of the ignition (shown by arrows), fuel injection (shown by marks of rectangular projections) and water injection (shown by hatched marks) are shown correspondingly to the crank angles. The length of the rectangular projections of the marks of the fuel injection corresponds to a fuel injection rate, which corresponds to the opening time of the injection ports 13 as mentioned above. The length of the hatched marks of water injection corresponds to a water injection rate, which corresponds to the opening time of the water injection control valve 12 as mentioned above.

FIGS. 5A and 5E are timing charts of a regular diesel engine in operation with a low load and a high load respectively. As mentioned above, the fuel is injected and ignited at a predetermined time in the vicinity of a top dead center (T.D.C.) during a compression stroke ((a bottom dead center (B.D.C.)—a top dead center (T.D.C.)).

A case where the control example 1 is executed in ECU 5 will now be described.

When a judgement that the engine 1 has a low load at present is made in the ECU 5, the ECU 5 outputs a water passage opening instruction to the water injection control valve 12 so that the water injection is started zero to several milli seconds before the starting of the fuel injection with the water injection finishing in the midst of the fuel injection. The ECU 5 also outputs (refer to FIG. 5B) an injection port opening instruction to the fuel injection nozzle 8 so that the fuel injection is started at the time earlier than a regular fuel injection time (FIG. 5A).

The control operation is arranged so that the water injection is started before the starting of the fuel injection, for the purpose of holding the water in the water holding portion 16 in advance before the injection of the fuel from the injection ports 13 is started. A maximum water holding quantity of the water holding portion 16 is set to a level corresponding to a fuel quantity in a case where the engine 1 is operated at a rated point (maximum output).

When the water injection control valve 12 is opened, the water flows from the water passage 11 into the water injection passage 11a, and the water is then supplied to and held in the water holding portion 16 via the water injection passage 11a, water circulating passages 14 and water supply passages 15.

When the injection ports 13 are opened, the fuel is injected from the fuel injection nozzles 8 toward the water supplied from the water supply passage 15 and held in the water holding portion 16.

Since the fuel is injected toward the water supplied from the water supply passages 15 and held in the water holding portion 16, a mixed fuel in which the fuel and water are mixed with each other is injected from the fuel discharge port 17b into the combustion chamber 2. Therefore, the fuel and water are uniformly dispersed in the combustion chamber 2, and microscopically put in the condition in which the particles of the fuel are covered with the inert vapor. Accordingly, an ignition delay of the fuel occurs, and the combustion of the fuel starts with the mixing of the fuel and suction air with each other promoted. This enables an increase in the temperature in a local combustion field to be avoided. As a result, this embodiment becomes possible to hold down the formation of nitrogen oxides to a level equal to or lower than that in a related art fuel injection system using an aqueous emulsion fuel.

According to the structure shown in FIG. 4B, the water supply passage 15 communicates in a position offset from the centers of cross sections of the fuel passage 17 and water holding portion 16 with the water holding portion 16. When the water is supplied from the water supply passage 15 to the water holding portion 16 as shown in FIG. 4D, the water is held mainly on an inner circumferential surface of the water holding portion 16 by a centrifugal force. Therefore, the water is mixed with the fuel, which passes through an inner side thereof, so as to cover the fuel therewith, and the mixed fuel with a larger quantity of water contained in an outer circumferential portion of the fuel is injected from the fuel discharge port 17b to the interior of the combustion chamber 2. Since the fuel spray is covered with inert vapor, the ignition delay of the fuel is further promoted. As a result, the combustion of the fuel starts with the mixing of the fuel and suction air further promoted. This enables an increase in the temperature to a high level in a local combustion field to be further held down, and the formation of nitrogen oxides to be further reduced.

When this operation is as certained with reference to FIG. 5B, it is understood that, although the fuel is injected earlier in the engine in the embodiment than in a regular diesel engine (FIG. 5A), the ignition time in the former is later than that in the latter (refer to FIGS. 5A and 5B).

When a judgement that the engine 1 has a high load at present is made in the ECU 5, the ECU 5 outputs a water passage opening instruction in the same manner to the water injection control valve 12, and an injection port opening instruction to the fuel injection nozzle 18 (refer to FIG. 5F). The ECU 5 increases absolute values of water injection rate and fuel injection rate in accordance with a high load to levels higher than those during a low-load time, and varies the water injection rate and fuel injection rate so that these rates are different from each other (refer to FIGS. 5B and 5F). As a result, the water the quantity of which is different from that during a low-load time is supplied to the water supply passage 15, and the water the quantity of which is different from that during a low-load time is held in the water holding portion 16. Therefore, when the fuel is injected from the injection port 13 toward the water supplied from the water supply passage 15 and held in the water holding portion 16, the fuel and water are mixed with each other uniformly in the same manner as in a low-load time, and the formation of nitrogen oxides is held down.

According to the first mode of embodiment, a mixing ratio of the fuel to the water can be varied arbitrarily in accordance with the magnitude of an engine load in a short period of time, so that optimum combustion is always attained in the engine 1 during an operation of a construction machine.

When the engine 1 is started, it is desirable that a water injection rate be controlled to be zero or substantially zero for the purpose of improving the startability.

A description of the control example 1 has been given above. In the control example 2, the ECU 5 outputs a water passage opening instruction to the water injection control valve 12 (refer to FIGS. 5C and 5G) so that the water injection is started earlier than in the control example 1 and finishes before the starting of the fuel injection.

In the third embodiment, the ECU 5 outputs a water passage opening instruction to the water injection control valve 12 (refer to FIGS. 5b and 5H) so that the water injection is started later than that in the control example 1 and finishes after the finishing of the fuel injection.

In the control example 2 and control example 3, the formation of nitrogen oxides can be held down in the same manner as in the control example 1 to a level not lower than that in a case where a related art aqueous emulsion fuel is used. Moreover, even when a load varies, optimum combustion can always be carried out in the engine 1.

Second Mode of Embodiment:

In the first mode of embodiment, water is used as an inert material. Instead of the water, vapor may be used as an inert material.

The parts of the second mode of embodiment identical with those of the first mode of embodiment will be designated by the same reference numerals. The parts of the second mode of embodiment equivalent to those of the first mode embodiment will be designated by the same reference numerals with primes added thereto. Thus, a description of the parts of the second mode of embodiment will be omitted suitably. The parts of the second mode of embodiment which correspond to those of the first mode of embodiment, and which are different from the same, will be described.

Figure 6:
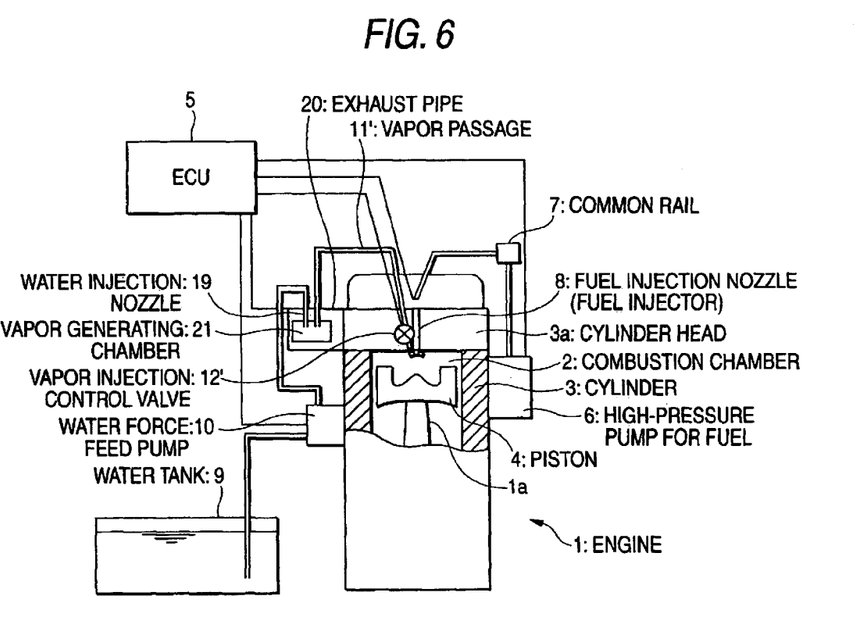
FIG. 6 is a drawing showing the construction of a second mode of embodiment.

FIG. 6 shows a structure corresponding to that of FIG. 1.

The water in a water tank 9 is sucked into a water pressure sending pump 10 and supplied to a water injection nozzle 19. The water is injected from the water injection nozzle 19 into a vapor generator 21, in which vapor is formed. The vapor generator 21 is provided in an exhaust pipe 20 of an engine 1. The vapor generated in the vapor generator 21 is supplied to a vapor supply passage 15' (refer to FIG. 2) in the vicinity of an outlet of an injection port 13 of a fuel injection nozzle 8 via a vapor passage 11' the vapor being then held in a vapor holding portion 16' (refer to FIG. 2). A vapor injection control valve 12' is provided in a vapor passage 11'. The vapor the quantity of which is proportional to the time for which the vapor injection control valve 12' is opened is supplied to the vapor supply passage 15' (refer to FIG. 2) in the vicinity of an outlet of the injection port 13 of the fuel injection nozzle 8, the vapor being then held in the vapor holding portion 16' (refer to FIG. 2).

Figure 7:
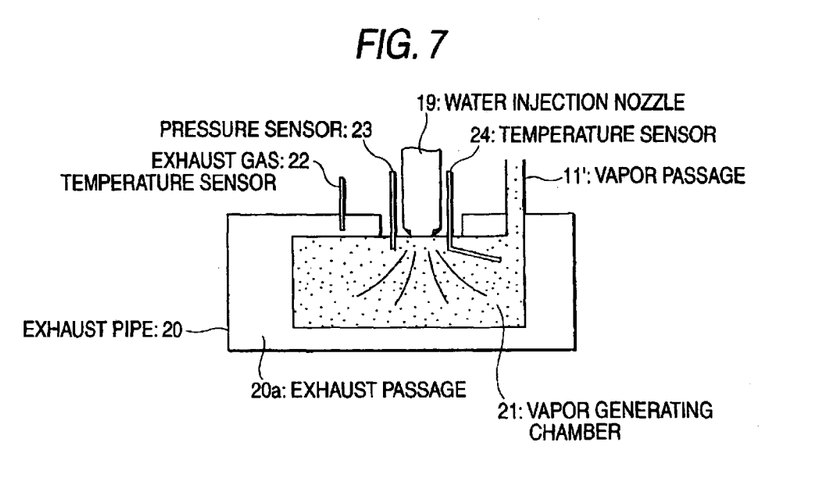
FIG. 7 is a drawing showing the construction of a vapor generating chamber shown in FIG. 1.

FIG. 7 shows the construction of the vapor generator 21.

The vapor generator 21 is provided with a pressure sensor 23, a temperature sensor 24, and an exhaust gas temperature sensor 22 in an exhaust passage 20a of an exhaust pipe 20.

The pressure sensor 23 detects the pressure of the vapor in the vapor generator 21, the temperature sensor 24 the temperature of the vapor in the vapor generator 21, and the exhaust gas temperature sensor 22 the temperature of the exhaust gas in the exhaust gas passage 20a. Output signals from these sensors are taken in an ECU 5. The ECU 5 feed back the output signals from the sensors 22, 23, 24, and controls an injection rate of the water injected from the water injection nozzle 19 into the vapor generator 21, in such a manner that the vapor in the vapor generator 21 attains a pressure and a temperature of desired levels.

The construction of a vapor supply mechanism and a fuel passage, which are provided on the outer side of a fuel injection nozzle 8, is identical with that of the corresponding parts shown in FIG. 2 mentioned above. As shown in FIG. 2, the vapor flows from the vapor passage 11' to a vapor injection passage 11'a in accordance with the opening of the vapor injection control valve 12'. The vapor is then supplied to the vapor holding portion 16' via the vapor injection passage 11'a, vapor circulating passage 14' and vapor supply passage 15', and held therein. The quantity (which will hereinafter be referred to as an injection vapor quantity) of vapor supplied to the vapor supply passage 15' and held in the vapor holding portion 16' in accordance with the opening of the vapor injection control valve 12' is determined.

Figure 8:
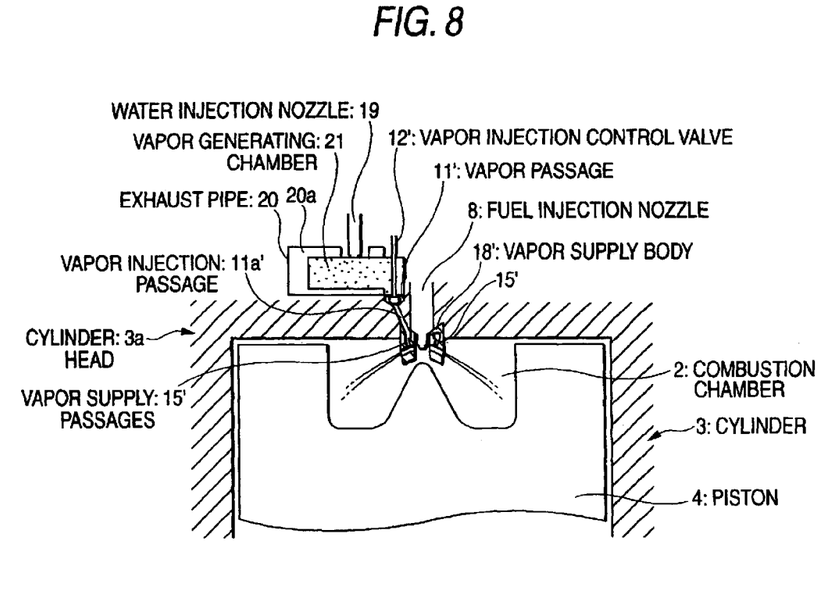
FIG. 8 is a drawing corresponding to FIG. 3, and showing a construction example provided with a vapor supply body around a fuel injection nozzle.

In the structure of FIG. 2, the vapor supply mechanism (vapor passage 11', vapor injection passage 11'a, vapor circulating passage 14', vapor supply passage 15' and vapor holding portion 16') and fuel passage 17, which are positioned on the outer side of the fuel injection nozzle 8, are formed in the cylinder head 3a. As shown in FIG. 8, a vapor supply body 18' may be provided on the outer side of a fuel injection nozzle 8, and a vapor supply mechanism (vapor injection passage 11*a*, vapor circulating passage 14', vapor supply passage 15' and vapor holding portion 16') similar to that shown in FIG. 2 and fuel passage 17 may then be formed in this vapor supply body 18'.

A structure in the vicinity of an injection port 13 of a vapor supply body 18 shown in FIG. 8 is identical with that shown in FIGS. 4A, 4B and 4C a description of which is given above.

Figure 9A:
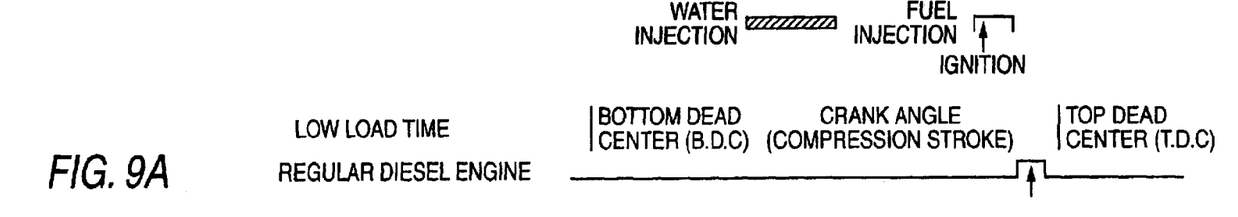
FIGS. 9A and 9E are timing charts of a regular diesel engine.
Figure 9B:
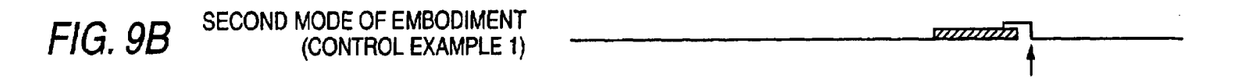
FIGS. 9B, 9C, 9D, 9F, 9G and 9H are timing charts of the diesel engine in the second mode of embodiment.
Figure 9C:
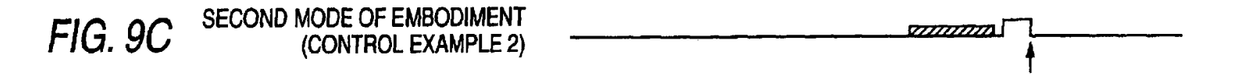
Figure 9D:
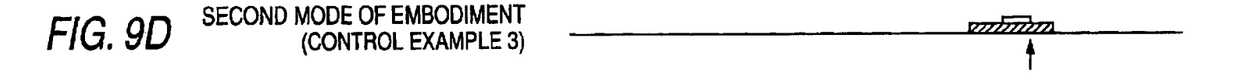
Figure 9E:
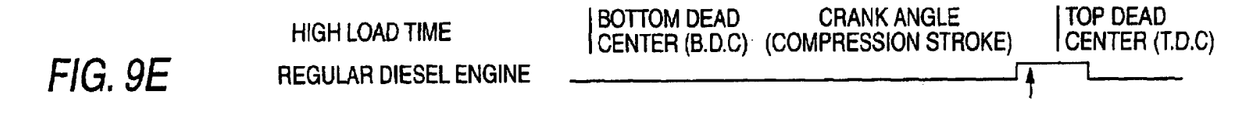
Figure 9F:
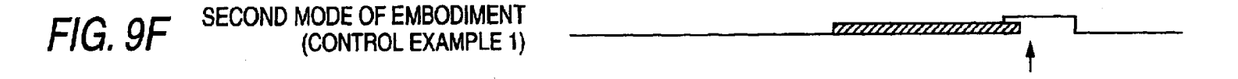
Figure 9G:
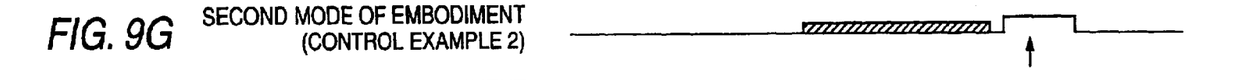
Figure 9H:
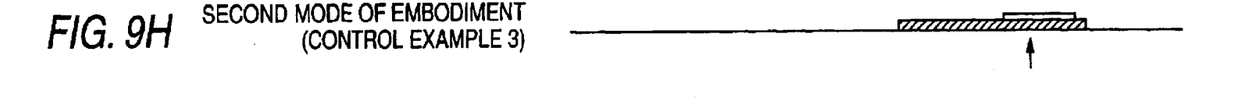

The timing charts of the second mode of embodiment are shown in FIGS. 9B, 9C, 9D, 9F, 9G and 9H. FIGS. 9B, 9C and 9D correspond to FIGS. 5B, 5C and 5D of the first mode of embodiment, and show control examples 1, 2 and 3 with the engine 1 having a low load respectively. FIGS. 9F, 9G and 9H correspond to FIGS. 5F, 5G and 5H of the first mode of embodiment, and show control examples 1, 2 and 3 with the engine 1 having a high load respectively.

The length of the hatched marks of vapor injection in FIG. 9 corresponds to the quantity of the above-mentioned injection vapor. The quantity of this injection vapor corresponds as mentioned above to the opening time of the vapor injection control valve 12'.

FIGS. 9A and 9E are timing charts of a regular diesel engine with the engine having a low load and a high load respectively.

As is understood well when FIG. 9 is compared with FIG. 5, vapor is supplied earlier to a position in the vicinity of the injection port 13 than the water. The reason is that a transfer speed of the vapor is lower than that of the water. Namely, the vapor requires much time to have the same reach a position in the vicinity of the injection port 13.

In the same manner as in the case of the first mode of embodiment, the ECU 5 outputs a vapor passage opening instruction to the vapor injection control valve 12', and an injection port opening instruction to the fuel injection nozzle 8. The ECU 5 varies absolute values of a water injection rate and a fuel injection rate in accordance with the magnitude of an engine load, and varies the vapor injection rate and fuel injection rate so that ratios of these rates are different.

As a result, vapor the quantity of which is in accordance with the magnitude of an engine load is supplied to the vapor supply passage 15', and vapor the quantity of which is in accordance with the magnitude of an engine load is held in the vapor holding portion 16'. Therefore, when the fuel is injected from the injection port 13 toward the vapor supplied from the vapor supply passage 15' and held in the vapor holding portion 16', the fuel and vapor are mixed with each other uniformly in the combustion chamber 2 in the same manner as in the first mode of embodiment. As a result, an ignition delay occurs, and the formation of nitrogen oxides is held down.

According to the second mode of embodiment, a mixing ratio of the fuel to the vapor can be varied arbitrarily in accordance with the magnitude of a load and in a short period of time, optimum combustion is always attained in the engine 1 during an operation of a construction machine.

Furthermore, the vapor is formed owing to the exhaust heat in the exhaust pipe 20, and the exhaust energy is turned into a vapor pressure and taken into the combustion chamber 2, so that the fuel consumption is improved effectively.

According to the above-described modes of embodiment, an ignition delay occurs in the combustion chamber, and the fuel burns in the condition in which the fuel is sufficiently dispersed in the combustion chamber 2. Therefore, the formation of soot can be held down equally or more greatly than that in the case where a related art aqueous emulsion fuel is used, without causing a local excessively rich portion to occur.

In the above-described modes of embodiment, the fuel is injected from the injection port 13 toward the water or vapor. A material to be injected from the injection port 13 may be a material inert with respect to the fuel, i.e. an inert material of a low ignitabiliy. Instead of the water and vapor, alcohol and an aqueous emulsion may be used.

Figure 10:
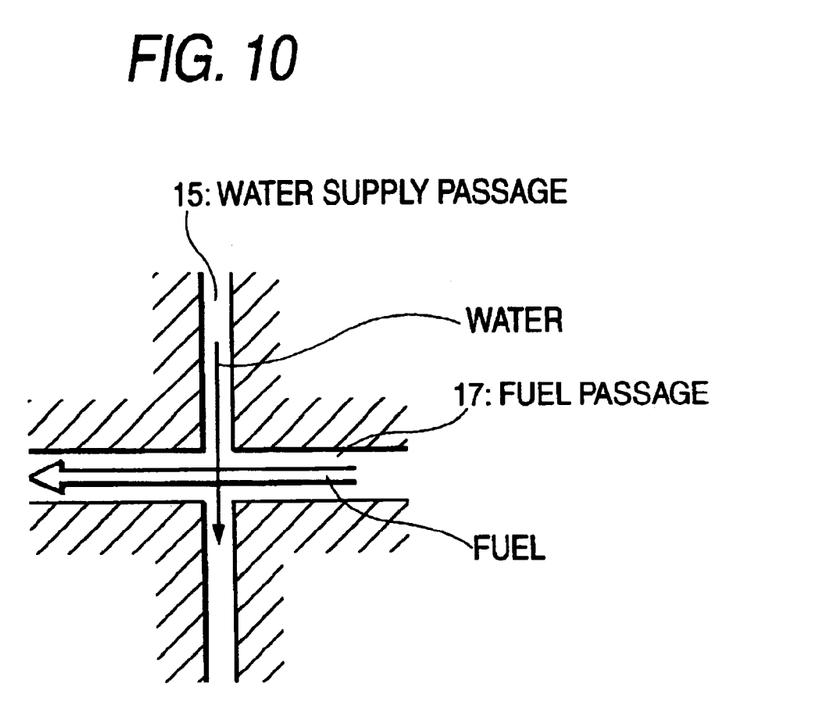
FIG. 10 is a drawing showing a modified example of the mode of embodiment.

In the above-described modes of embodiment, the water is held in the water holding portion 16. As shown in FIG. 10, the fuel may be injected toward the water supplied from the water supply passage 15 without being held, via the fuel passage 17. The same applies to the vapor.

What is claimed is:

1. A fuel injection system for a diesel engine, comprising:
   a fuel injection nozzle adapted to inject a fuel toward the interior of a combustion chamber of the diesel engine,
   an inert material supply passage from which an inert material with respect to the fuel is supplied, and
   a fuel passage communicating with the insert material supply passage and adapted to pass through the fuel injected from the fuel injection nozzle therethrough,
   wherein a gap is provided between the fuel injection nozzle and the fuel passage, and
   wherein the fuel from the fuel injection nozzle is injected toward an insert material supplied from the insert material supply passage.

2. The fuel injection system for a diesel engine according to claim 1, further comprising:
   a controller controlling a quantity of the inert material supplied from the inert material supply passage.

3. The fuel injection system for a diesel engine according to claim 1, wherein the fuel injection nozzle includes an injection port and the fuel passage includes a fuel inlet port at an end thereof, and wherein the gap is provided at least between the injection port and the fuel inlet port.

4. A fuel injection system for a diesel engine comprising:
   a fuel injection nozzle adapted to inject a fuel toward the interior of a combustion chamber of the diesel engine,
   an inert material supply passage from which an inert material with respect to the fuel is supplied, and
   a fuel passage communicating with the inert material supply passage, and adapted to pass through the fuel injected from the fuel injection nozzle therethrough,
   wherein a gap is provided between the fuel injection nozzle and the fuel passage,
   wherein the inert material supply passage is communicating with the fuel passage in a position offset from a center of cross sections of the fuel passage, and
   wherein the fuel from the fuel injection nozzle is injected toward the inert material supplied from the inert material supply passage.

5. The fuel injection system for a diesel engine according to claim 4, further comprising:
   a controller controlling a quantity of the inert material supplied from the inert material supply passage.

6. The fuel injection system for a diesel engine according to claim 4, wherein the inert material supply passage communicates with a holding portion for holding the inert material, and wherein the fuel passage is arranged in a manner that causes the fuel injected from the fuel injection nozzle to pass through the inert material in the fuel passage.

7. The fuel injection system for a diesel engine according to claim 4, wherein the fuel injection nozzle includes an injection port and the fuel passage includes a fuel inlet port at an end thereof, and wherein the gap is provided at least between the injection port and the fuel inlet port.

8. A fuel injection system for a diesel engine, comprising:

a fuel injection nozzle adapted to inject a fuel toward the interior of a combustion chamber of the diesel engine, an inert material supply passage from which an inert material with respect to the fuel is supplied, and a fuel passage communicating with the inert material supply passage, and adapted to pass through the fuel injected from the fuel injection nozzle therethrough, wherein the inert material supply passage communicates with a holding portion holding the inert material, and wherein the fuel from the fuel injection nozzle passes through the holding portion, when the fuel is injected toward the inert material supplied from the inert material supply passage.

9. The fuel injection system for a diesel engine according to claim 8, further comprising:

a controller controlling a quantity of the inert material supplied from the inert material supply passage.

10. The fuel injection system for a diesel engine according to claim 8, wherein the fuel passage is arranged in a manner that causes the fuel injected from the fuel injection nozzle to pass through the inert material in the fuel passage.

* * * * *